United States Patent
Wipasuramonton et al.

(10) Patent No.: US 6,802,530 B2
(45) Date of Patent: Oct. 12, 2004

(54) ROLLOVER AIR BAG WITH DAMPING MECHANISM

(75) Inventors: Pongdet P. Wipasuramonton, Rochester, MI (US); Charles S. E. Walczak, Warren, MI (US); Shakir M. Salmo, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 09/963,841

(22) Filed: Sep. 26, 2001

(65) Prior Publication Data

US 2003/0057683 A1 Mar. 27, 2003

(51) Int. Cl.[7] .............................................. B60R 21/22
(52) U.S. Cl. .................................................. 280/730.2
(58) Field of Search ......................... 280/730.2, 730.1, 280/743.1, 743.2, 729, 742

(56) References Cited

U.S. PATENT DOCUMENTS

| 279,944 A | | 8/1883 | Wipasuramonton et al. ....................... 280/730.2 |
| 5,713,598 A | * | 2/1998 | Morita et al. |
| 5,791,685 A | * | 8/1998 | Lachat et al. ................ 280/729 |
| 6,170,860 B1 | * | 1/2001 | Denz et al. ............... 280/730.2 |
| 6,279,944 B1 | * | 8/2001 | Wipasuramonton et al. ........................ 280/729 |
| 6,431,589 B1 | * | 8/2002 | Heigl et al. .............. 280/730.2 |

* cited by examiner

Primary Examiner—Faye M. Fleming
(74) Attorney, Agent, or Firm—Markell Seitzman

(57) ABSTRACT

A rollover air bag system comprising: at least a first inflatable first chamber, the air bag adapted to be mounted within a passenger compartment of a vehicle in a manner such that when the air bag is inflated the first inflatable chamber is positioned to receive and protect the head of an occupant, an accumulator chamber located downstream of the first chamber, the accumulator chamber initially maintained at a negative pressure relative to the inflated first chamber, wherein in order to restrict the pressure in the first chamber from increasing upon impact with a body part of the occupant, the inflation gas in the first chamber is allowed to be pushed into the accumulator chamber.

19 Claims, 6 Drawing Sheets

ROLLOVER AIR BAG WITH DAMPING MECHANISM

BACKGROUND AND SUMMARY OF THE INVENTION

The present invention generally relates to air bags and more specifically to an air bag useful in a rollover accident.

The prior art has recognized a need for an air bag useful in a side impact accident. One such side impact air bag is stored at or near the roof rail of the vehicle. This type of air bag is typically long and narrow in construction and, when deployed, extends from the roof rail to approximately shoulder height and is designed primarily to protect the head of the occupant from impacting the window and/or side of the vehicle. Some air bags extend from the front or A-pillar, across a middle or B-pillar, to a rear C and/or D-pillar of the vehicle. U.S. Pat. No. 6,074,961 is typical of a side impact, curtain air bag. As can be seen, the air bag includes a forward and rear inflatable volume and a central non-inflated, inactive zone, which is typically located proximate a non-occupied region of the vehicle such as the B-pillar. In a typical side impact accident, the entire accident lasts less than 100 milliseconds and during that time the air bag must inflate, position itself between the occupant and the side of the vehicle and deflate.

The construction of a curtain air bag that is designated to protect an occupant during a vehicle rollover is substantially identical to the construction of a side impact air bag. The basic difference is that care must be taken in the design to insure that the air bag retains a sufficiently high pressure for relatively long periods of time (as a rollover accident takes many seconds to complete). This inflation period is equal to or greater than, for example, five to seven seconds, as the air bag must remain inflated for this longer time to protect the occupant at the end of end of the longer, rollover event. Even if the material used to construct the air bag is made from low or even zero permeability material, a certain amount of inflation gas may leak through any sewn seam, tending the reduce the pressure within the air bag. Even if the bag uses zero permeability material and does not utilize any sewn seam, the pressure within the air bag will reduce as the inflation gas cools. The internal pressure may also be reduced because the fabric has been stretched creating a larger volume. To compensate for this reduction in pressure over an extended time period it has been proposed to over inflate the air bag typically using a high capacity inflator. The effect of using the higher capacity inflator and over inflating the air bag is to produce an air bag or cushion that is relatively stiff and more resilient and which may act as an air spring. Consequently, during the initial moments of a side impact or rollover accident, the occupant's head may rebound off of this stiff cushion, which may result in a high HIC level in excess of 900.

It is an object of the present invention to provide a rollover curtain air bag that is capable of maintaining an adequate pressure for an extended period of time but without causing such high HIC injury levels.

It is a further object of the present invention is to provide an air bag with an accumulator pocket, which controls the resiliency of the inflatable portions of the air bag.

Accordingly the invention comprises: a rollover air bag system comprising: at least a first inflatable first chamber, the air bag adapted to be mounted within a passenger compartment of a vehicle in a manner such that when the air bag is inflated the first inflatable chamber is positioned to receive and protect the head of an occupant, an accumulator chamber in communication with the first chamber, the accumulator chamber initially maintained at a negative pressure relative to the inflated or partially inflated first chamber, wherein in order to restrict the pressure in the first chamber from increasing upon impact with a body part of the occupant, the inflation gas in the first chamber is allowed to flow into the accumulator chamber. In one embodiment the air bag extends between at least two vehicle pillars and can extend across all of the vehicle pillars. In another embodiment the air bag is substantially smaller and blocks interaction between the occupant and the side of the vehicle, which may include a single pillar or the roof rail or window area.

Many other objects and purposes of the invention will be clear from the following detailed description of the drawings.

DETAILED DESCRIPTION OF THE DRAWINGS

Figure 1:
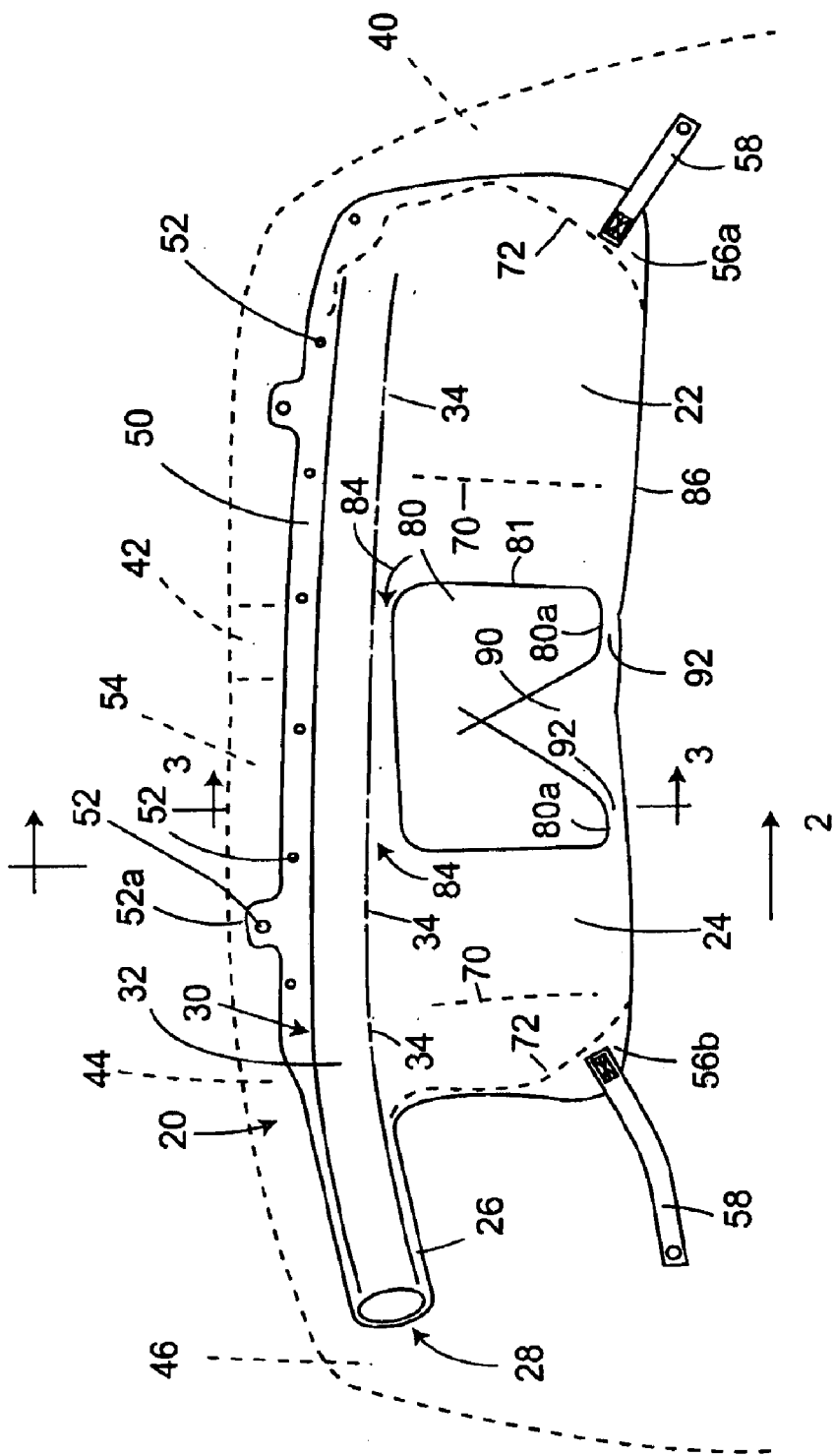
FIG. 1 is a plan view of a rollover curtain air bag.

The figures illustrate various views of a rollover air bag 20. The air bag 20 can be made of one or more pieces of material configured to provide a forward 22 and rear 24 inflatable section, as well as an inlet 26 adapted to receive inflation gas from an inflator, which is diagrammatically represented as arrow 28. The air bag 20 includes an inflation gas distribution element generally shown as 30. This gas distribution element 30 may include a thin, flexible tube 32 having a plurality of exit ports 34 to communicate the gas into the various sections of the air bag. In one embodiment, the air bag 20 is of sufficient length to extend from a forward or front A-pillar 40, across the B-pillar 42, and extend to the C-pillar 44 of the vehicle. A similar arrangement can also be applied for longer air bags so that they fit between the vehicle's A-D-pillars (the D-pillar is schematically shown by numeral 46). A shorter bag can extend only across two pillars such as the A-B or B-C pillars. The inlet 26 can be located adjacent any of the pillars of the vehicle and communicated to any portion of the air bag. The top 50 of the air bag may include a plurality of mounting features such as openings 52 (or tabs 2a with openings 52) which facilitate the mounting of the air bag proximate the roof rail 54 (see FIG. 4). The lower corners 56a and 56b (which are typically not inflatable) of the air bag are fitted with straps or tethers 58, which hold and guide the inflated air bag in place. As shown In FIG. 1 the tethers are made of straps however, in FIGS. 5 and 6 the tethers are made using sections of air bag material. Prior to inflation, the air bag is stored near the roof rail in a folded condition (again see FIG. 4) and covered by a breakable (or openable) cover 60, which may be fabric or plastic. Also, when the air bag is in its folded condition, the tethers (straps or material sections or otherwise) are orientated at a stowed position adjacent the corresponding vehicle pillar 40 and 44 and covered by a breakable trim, as known in the art (not shown).

The air bag 20 may be manufactured of a woven material, such as 215, 315, 420 denier nylon, appropriately coated with silicone or urethane or the like to reduce the permeability of air flow through the air bag to virtually zero. The material may be sewn or ultrasonically welded about a peripheral seam 72 to achieve the shape shown in FIG. 1. Additional seams or restrictions such as 70, which effectively reduce the inflated volume of chambers 22 and 24, can be achieved by sewing or welding opposing sides of the air bags together. Similarly, the peripheral seam 72 or seam 70 can be achieved by any known technology. Additionally, the tube (and ports 34) can be integrally formed by selectively joining the opposing sides of the air bag or, alternatively, a separate plastic or woven tube inserted within the top of the air bag.

As mentioned above many air bags, in addition to including one or more inflatable portions 22 and 24, also include an uninflatable or inactive portion or zone 80. As illustrated in FIG. 1, this zone is formed by a sewn or welded seam 81. Also in FIG. 1, inflation gas can flow about the top of the inactive zone 80 as shown by arrows 84. The inactive zone reduces the inflatable volume of the air bag and correspondingly reduces the requirements of the inflator. The inactive zone is placed in an area of the air bag that is not contacted by the occupant. In the present invention the air bag includes an accumulator (or accumulator chamber) 90, which is positioned below the inactive zone 80. The accumulator 90 is communicated to one or both inflatable chambers 22 and 24. Additionally, the lower portions, such as 80a of the inactive zone 80 (as formed by seams 81), are spaced from the lower edge 86 of air bag 20 to provide at least one flow passage or orifice 92 into and out of the accumulator chamber 90. Two such passages 92 are shown in FIG. 1. As illustrated in FIG. 1, one orifice 92 is positioned between the accumulator chamber 90 and inflatable chamber 22, while another orifice 92 is located between the accumulator chamber 90 and the rear inflatable chamber 24. For example, if only a forward orifice is utilized, the seam 96 defining the inactive zone would extend downwardly to the lower extremes 86 of the air bag 20. As can be appreciated, the accumulator chamber 90 is formed by the material or panels of the air bag.

Figure 1A:
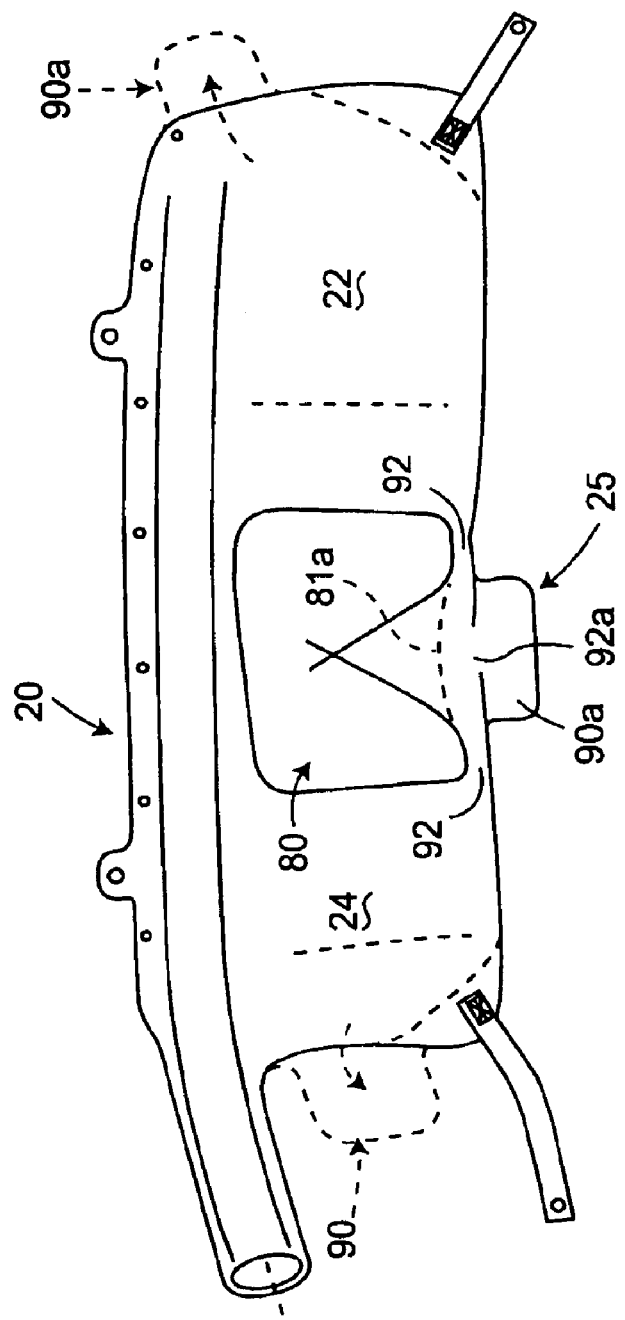
FIG. 1a shows an alternate embodiment of the invention.
Figure 2:
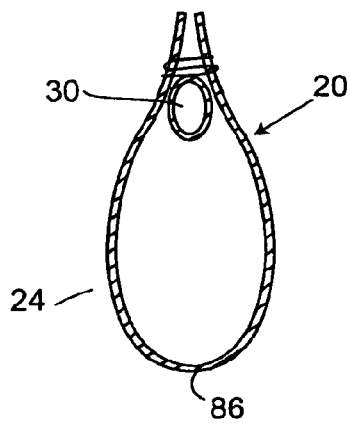
FIG. 2 is a cross-sectional view through section 2—2 of FIG. 1.

Reference is briefly made to FIG. 1a, which includes most of the features of the air bag shown in FIG. 1. An added material sack or lobe 25 is positioned at the bottom of the air bag. The sack 25 is substantially airtight and is communicated to the air bag 20 via a passage 92a. The sack 25 is made of a resilient material such as urethane or other rubber-like material and forms in a resilient accumulator chamber 92a. The accumulator 92a can be formed using the conically shaped accumulator 90 (see FIG. 1) or the shape of the seam 81a forming the inactive zone 80 can be changed to reduce or eliminate the volume that formed the accumulator 90. As the inflated portions of the air bag are loaded by the occupant, inflation gas therein is pushed or squeezed through the orifices 92 into the expandable accumulator chamber 90a damping the rebound motion of the occupant. The expandable chambers 90a can be located at other locations of the air bag as illustrated by phantom line in FIG. 1a (added flow passages 92a are not shown). The air bag 20 may include one or more accumulator chambers 90a.

Figure 4:
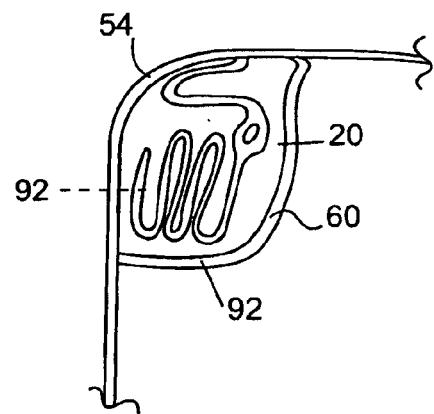
FIG. 4 diagrammatically illustrates a folded air bag mounted proximate the roof rail of the vehicle.
Figure 3:
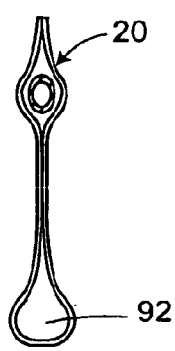
FIG. 3 is a cross-sectional view through section 3—3 of FIG. 1 and FIG. 4.

Upon sensing the rollover or side impact accident, a related controller activates the inflator, which supplies inflation gas to the folded air bag shown in FIG. 4. Preferably, the air bag is folded or rolled such that the orifices 92 will be exposed to inflation gas at the last or the later stages of inflation. As can be seen in FIG. 4, the air bag 20 is folded with a plurality of accordion pleats with the orifices 92 residing in the last pleat or the last few pleats. As the air bag (of FIG. 1) begins to inflate, those pleats closer to the tube 30 will begin to inflate. Subsequently, as the bag expands and breaks out of the cover 60, the lower extremes (including the last pleats) of the inflatable chambers 22 and 24 are exposed to inflation gas at a later time than those portions of the bag near the tube 30. By positioning the orifices near the lower extremes of the air bag, as adjacent, upstream portions of chambers 22 and 24 begin to expand on receipt of the inflation gas, the expansion of these chambers will create a temporary negative pressure due to expansion of the active chambers, tending to cause any residual air in the accumulator chamber 90 to flow outwardly into chambers 22 and 24. Eliminating residual air in the accumulator chamber makes it more efficient during an accident however, this is not a requirement of the present invention.

Figure 5:
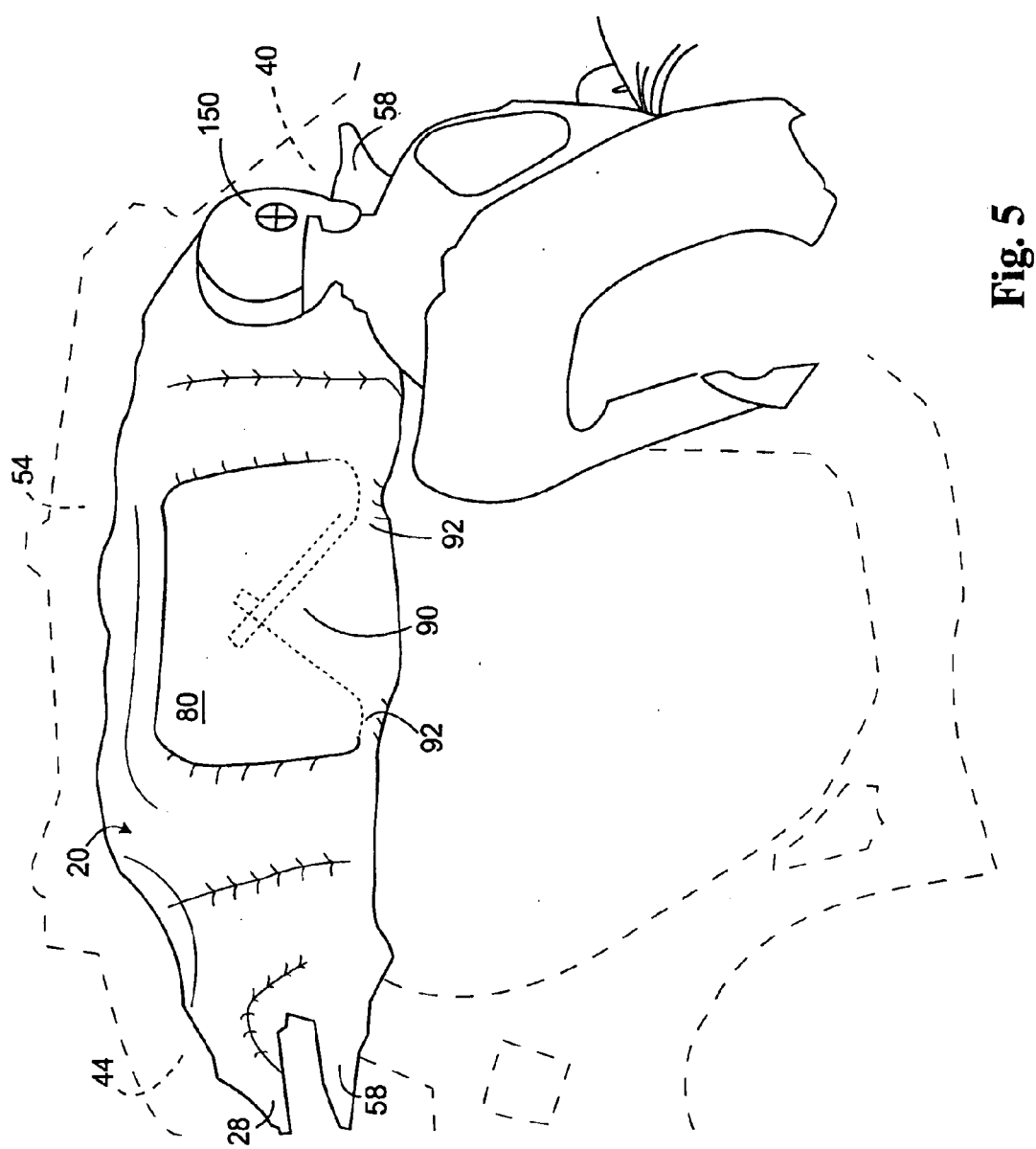
FIGS. 5 and 6 show various stages of an inflating air bag.
Figure 6:
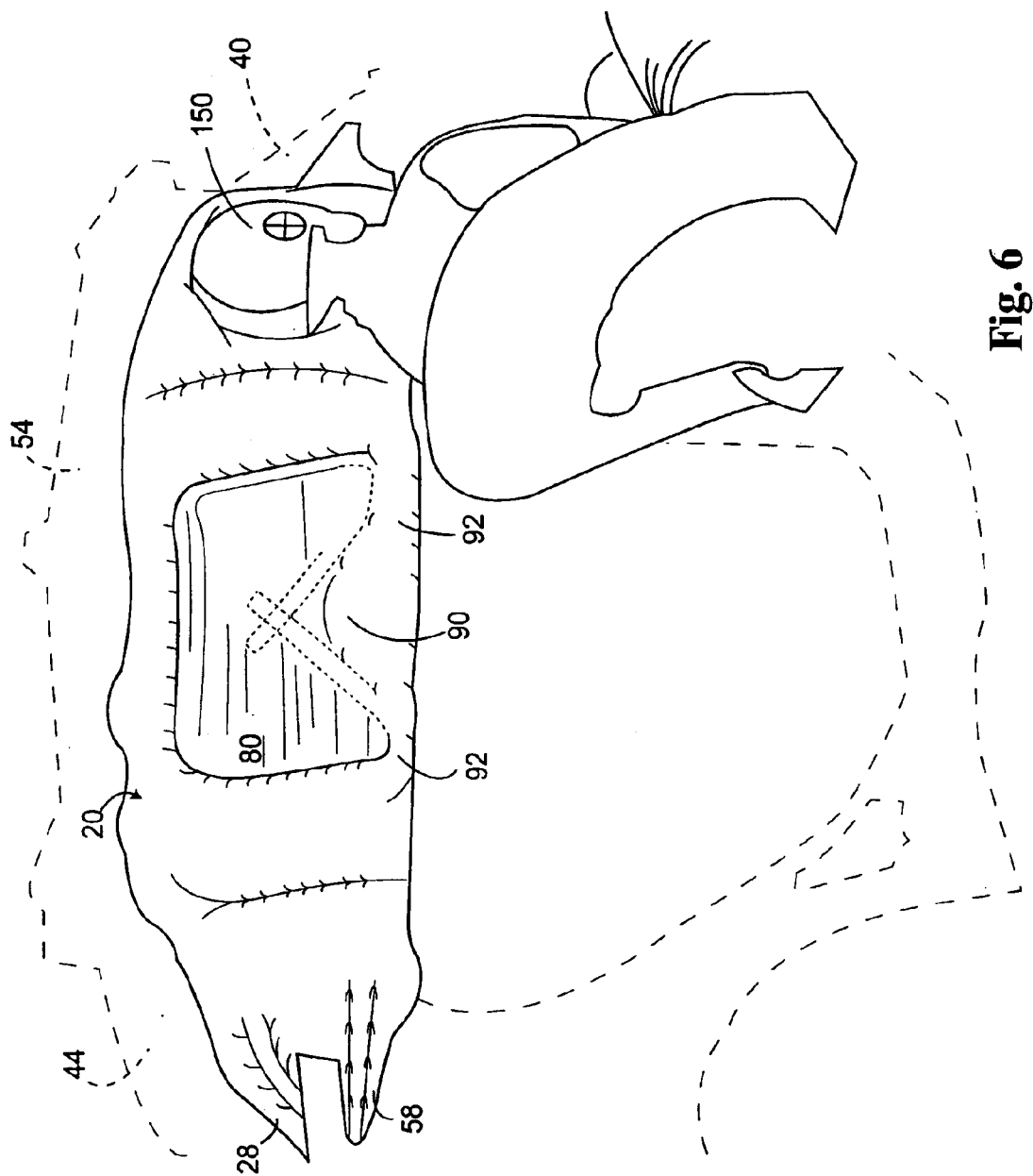

Reference is briefly made to FIGS. 5 and 6, which are figures redrawn from photographs of a side impact pole test of an air bag 20 (such as shown in FIG. 1) made in accordance with the present invention. In this air bag, the inflatable volume is approximately 26 liters but it may be in any range of volumes, such as 15 liters to 50 liters. Additionally, the area of each one of the orifices 92 is approximately 390 sq. mm. and it may be in the range of about 127 sq. mm. to about 600 sq. mm, depending upon the effective chamber pressure and volume of the accumulator 90.

In FIG. 5 the seated occupant 150 has not yet begun to load the forward chamber 22 of the air bag. Additionally, the accumulated chamber 90 seems to be virtually devoid of any inflation gas at this time. FIG. 6 shows a later time in the accident, the occupant's head is in contact with chamber 22. As can be seen, as a result of the occupant's head loading the inflated cushion, inflation gas previously in chamber 22 has been moved through orifice 92 into the accumulator chamber 90. This controlled reduction of the inflated volume of chamber 22 and the pressure therein dampens the motion of the occupant's head and permits the head to remain in contact with the air bag as chamber 22 is temporarily deflating. The action of permitting the head to remain in contact with the deflating air bag is sometimes referred to as ride-down in the art.

Figure 7:
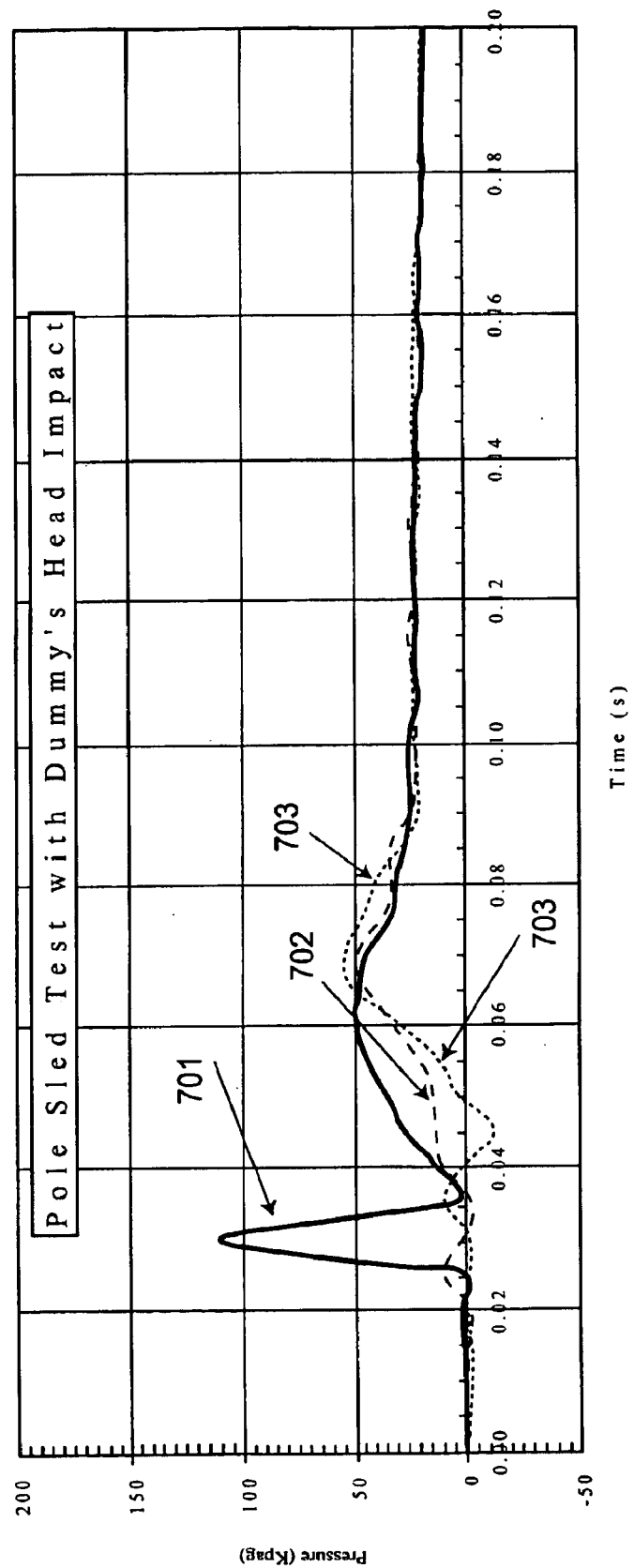
FIG. 7 shows time histories of pressure in an air bag.

The benefit of the present invention can be seen from the following. The HIC value measured in the above mentioned test was approximately 477. In a similar test but without an accumulator chamber the HIC value was 900, showing the improvement attributable to the present invention. Reference is briefly made to FIG. 7, which shows time histories of the pressure in the front 22, rear 24 and accumulator 90 chambers, see respective curves 701, 702 and 703.

Figure 8:
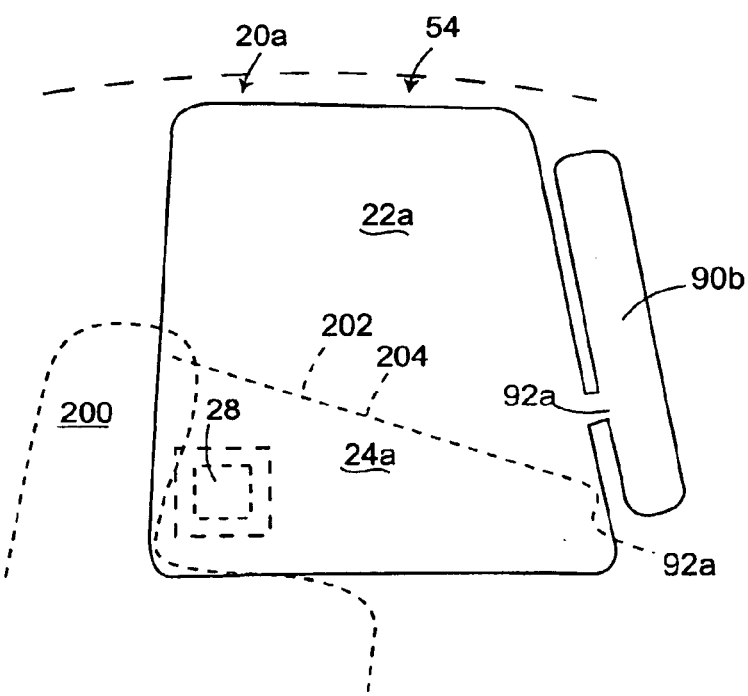
FIG. 8 shows still another embodiment of the invention.

Reference is briefly made to FIG. 8, which shows another embodiment of the invention, which shows a multi-chambered air bag 20a, which can be located within a vehicle seat 200 or elsewhere in the vehicle such as on a side portion or door panel, below the window area. When inflated, the air bag extends upwardly to cushion the side and head of the occupant relative to the vehicle. The air bag may include a lower or thorax chamber 23 and an upper or head chamber 22. The chambers are separated by a series of stitches or a separator panel, both generally shown by numeral 202. The stitches or separator panel form or have an orifice for communicating inflation gas thereacross. In this embodiment, the inflator 28 first communicates gas to the lower chamber. The upper chamber 22 is the last to fill as inflation gas migrates from chamber to chamber. During a side impact or rollover accident the occupant's torso will typically impact the lower chamber 24, which pushes inflation gas into the upper chamber 22 prior to the upper chamber being impacted by the occupant's head. In some situations, the pressure in the upper chamber may increase rapidly, which will cause the head to rebound due to the resiliency of the upper chamber, which may increase HIC criteria to an unwanted level. Air bag 20a also includes an expandable sack, chamber or bladder 92a (similar to that shown in FIG. 1a) which defines a resilient accumulator chamber 90a. In the embodiment shown, the accumulator chamber 90a is in direct communication with the upper chamber through a narrow orifice or passage 92a, thereby controlling the release of pressure of the upper or head chamber 22. FIG. 8 also shows a further embodiment in which the orifice or passage 92a is located at the transition between the upper 22 and the lower chamber 24.

Many changes and modifications in the above-described embodiment of the invention can, of course, be carried out without departing from the scope thereof. Accordingly, that scope is intended to be limited only by the scope of the appended claims.

What is claimed is:

1. An air bag system comprising:
   at least a first inflatable first chamber, the air bag adapted to be mounted within a passenger compartment of a vehicle in a manner such that when the air bag is inflated the first inflatable chamber is positioned to receive and protect the head of an occupant;
   an accumulator chamber located downstream of the first chamber, the accumulator chamber initially at a negative pressure relative to the inflated first chamber, wherein in order to restrict pressure in e first chamber from increasing upon impact with a body part of the occupant, the inflation gas in the first chamber is allowed to be pushed into the accumulator chamber; and
   a non inflatable chamber located adjacent the accumulator chamber.

2. The device as defined in claim 1 wherein the accumulator chamber is located with the air bag.

3. The device as defined in claim 1 wherein the air bag is made of one type of material and wherein the accumulator is made from a material more resilient than that of the air bag.

4. The device as defined in claim 1 wherein the accumulator chamber includes a first orifice at the juncture of the first chamber and the accumulator chamber.

5. The device as defined in claim 4 wherein the area of the first orifices is about 127 sq. mm. to about 389 sq. mm.

6. The device as defined in claim 4 wherein the first orifice is located in the air bag at a location that is one of the last portions of the air bag to be inflated.

7. The air bag as defined in claim 1 further including a source of inflation gas and a distribution means for delivering the inflation gas along a longitudinal portion of the air bag, and wherein the first orifice is located, at the periphery of the air bag, generally opposite the location of the distribution means.

8. An air bag system comprising:
   at least a first inflatable first chamber, the air bag adapted to be mounted within a passenger compartment of a vehicle in a manner such that when the air bag is inflated the first inflatable chamber is positioned to receive and protect the head of an occupant;
   an accumulator chamber located downstream of the first chamber, the accumulator chamber initially at a negative pressure relative to the inflated first chamber, wherein in order to restrict pressure in the first chamber from increasing upon impact with a body part of the occupant, the inflation gas in the first chamber is allowed to be pushed into the accumulator chamber;
   wherein the accumulator chamber is located exterior to a main portion of the air bag and is only connected to the main portion through a tube which functions as an orifice.

9. An air bag system comprising:
   at least a first inflatable first chamber, the air bag adapted to be mounted within a passenger compartment of a vehicle in a manner such that when the air bag is inflated the first inflatable chamber is positioned to receive and protect the head of an occupant;
   an accumulator chamber located downstream of the first chamber, the accumulator chamber initially at a negative pressure relative to the inflated first chamber, wherein in order to restrict pressure in the first chamber from increasing upon impact with a body part of the occupant, the inflation gas in the first chamber is allowed to be pushed into the accumulator chamber;
   wherein the air bag includes an inflatable second chamber and wherein the accumulator chamber includes a second orifice at the junction of the second chamber and the accumulator chamber, wherein the first and second chambers are inflated contemporaneously.

10. The device as defined in claim 9 wherein the ratio of the volumes of the inflatable chambers to the volume of the accumulator chamber is about 15–50/1.5.

11. An air bag system comprising:
    at least a first inflatable first chamber and non-inflatable chamber, the air bag adapted to be mounted within a passenger compartment of a vehicle in a manner such that when the air bag is inflated the first inflatable chamber is positioned to receive and protect the head of an occupant;
    an accumulator chamber located downstream of the first chamber and adjacent the non-inflatable chamber, the accumulator chamber initially at a negative pressure relative to the inflated first chamber, wherein in order to restrict pressure in the first chamber from increasing upon impact with a body part of the occupant, the inflation gas in the first chamber is allowed to the pushed into the accumulator chamber; and
    wherein prior to inflation the air bag is maintained in an uninflated, folded condition, and wherein the unfolding portions of the air bag create a vacuum in the vicinity of a first orifice to cause fluid in the accumulator chamber to be sucked out therefrom.

12. An air bag system comprising:
    at least a first inflatable first chamber and a non-inflatable chamber, the air bag adapted to be mounted within a passenger compartment of a vehicle in a manner such that when the air bag is inflated the first inflatable chamber is positioned to receive and protect the head of an occupant;
    an accumulator chamber located downstream of the first chamber and adjacent the non-inflatable chamber, the accumulator chamber initially at a negative pressure relative to the inflated first chamber, wherein in order to restrict pressure in the first chamber from increasing upon impact with a body part of the occupant, the inflation gas in the first chamber is allowed to be pushed into the accumulator chamber; and wherein the unfolding portions of the airbag cooperate to form a vacuum means for creating a low pressure region at the entrance of a first orifice to cause fluid in the accumulator chamber to be sucked out therefrom.

13. An air bag system comprising:

at least a first inflatable first chamber, the air bag adapted to be mounted within a passenger compartment of a vehicle in a manner such that when the air bag is inflated the first inflatable chamber is positioned to receive and protect the head of an occupant;

an accumulator chamber located downstream of the first chamber, the accumulator chamber initially at a negative pressure relative to the inflated first chamber, wherein in order to restrict pressure in the first chamber from increasing upon impact with a body part of the occupant, the inflation gas in the first chamber is allowed to be pushed into the accumulator chamber; and wherein the air bag includes a first and second inflatable chamber located on opposite sides of a non-inflatable region, and wherein the accumulator chamber is located adjacent to and along a lower portion of the non-inflatable chamber.

14. The device as defined in claim 13 wherein a lower portion of the non-inflatable chamber and an adjacent region of the accumulator chamber are conically shaped.

15. The air bag system as defined in claim 13 wherein the accumulator includes an inflatable lobe depending from the air bag.

16. An air bag system comprising:

at least a first inflatable first chamber and a non-inflatable chamber adjacent to the first chamber, the air bag adapted to be mounted within a passenger compartment of a vehicle in a manner such that when the air bag is inflated the first inflatable chamber is positioned to receive and protect the head of an occupant;

an accumulator chamber located downstream of the first chamber, the accumulator chamber initially at a negative pressure relative to the inflated first chamber, wherein in order to restrict pressure in the first chamber from increasing upon impact with a body part of the occupant, the inflation gas in the first chamber is allowed to be pushed into the accumulator chamber; wherein the accumulator chamber includes a first orifice at the juncture of the first chamber and the accumulator chamber; and wherein the first chamber is folded using a plurality of folds and wherein the orifice is located in one of the last of the folds remote from a source of inflation gas.

17. The device as defined in claim 16 wherein the plurality of folds includes a plurality of accordion folds.

18. A rollover air bag system comprising:

at least a first inflatable first chamber and a non-inflatable region, the air bag adapted to be mounted within a passenger compartment of a vehicle in a manner such that when the air bag is inflated the first inflatable chamber is positioned to provide a resilient cushion to protect the head of an occupant;

damping means positioned substantially adjacent the non-inflatable region for affecting a rebound force produced by the resilient cushion and for damping the motion of the head when in contact with the first chamber.

19. The device as defined in claim 18 wherein the damping means includes an accumulator chamber having an orifice interconnecting the first chamber and the accumulator chamber.

* * * * *